V. GIAMPIETRO.
OIL EXTRACTING APPARATUS.
APPLICATION FILED JAN. 12, 1920.

1,393,621.

Patented Oct. 11, 1921.
2 SHEETS—SHEET 1.

Inventor
V. Giampietro
By Victor J. Evans
Attorney

V. GIAMPIETRO.
OIL EXTRACTING APPARATUS.
APPLICATION FILED JAN. 12, 1920.
1,393,621.
Patented Oct. 11, 1921.
2 SHEETS—SHEET 2.
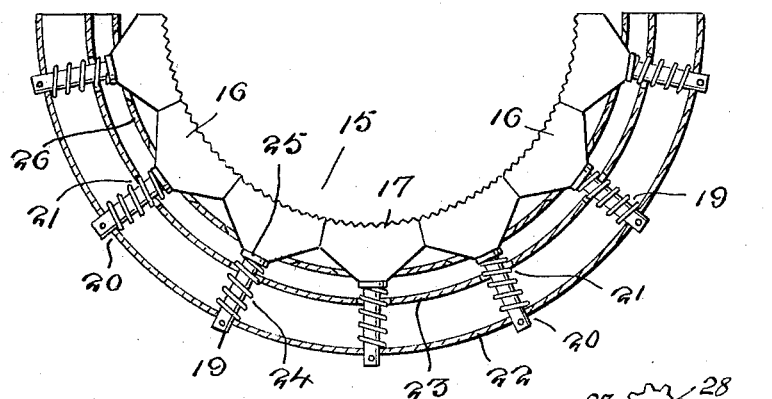
Fig. 3.
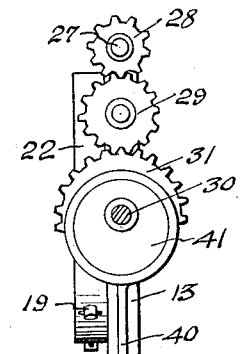
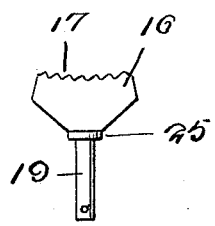
Fig. 4.
Fig. 5.
Inventor
V. Giampietro
By Victor J. Evans
Attorney

UNITED STATES PATENT OFFICE.

VINCENT GIAMPIETRO, OF BALTIMORE, MARYLAND.

OIL-EXTRACTING APPARATUS.

1,393,621.  Specification of Letters Patent.  Patented Oct. 11, 1921.

Application filed January 12, 1920. Serial No. 350,973.

*To all whom it may concern:*

Be it known that I, VINCENT GIAMPIETRO, a citizen of the United States, residing at Baltimore, Maryland, have invented new and useful Improvements in Oil-Extracting Apparatus, of which the following is a specification.

The object of the invention is to provide a simple and efficient means whereby the essential oils may be readily extracted from the skins or rinds of citrous fruits such as oranges, lemons, grape fruit and the like, for use in the preparation of flavoring extracts and the like, and under such conditions as to secure the oil without contamination by or admixture with other juices of the fruits, and to this end the invention consists in a construction and combination of parts of which a preferred embodiment is shown in the accompanying drawing, it being understood that changes in form and proportion may be resorted to within the scope of the appended claims without departing from the principles involved.

In the drawing:

Fig. 3 is a sectional view taken on a plane parallel with the series of blades.

Fig. 4 is a detail of one of the blades detached.

Fig. 5 is an elevation of the end opposite that shown in Fig. 2.

Figure 1:
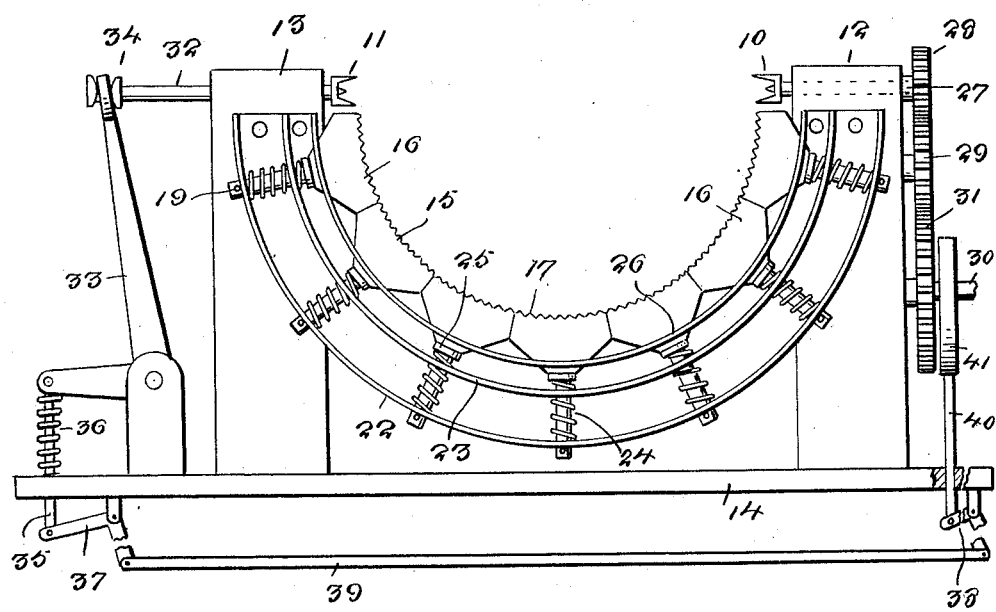
Figure 1 is a front elevation of an apparatus embodying the invention.
Figure 2:
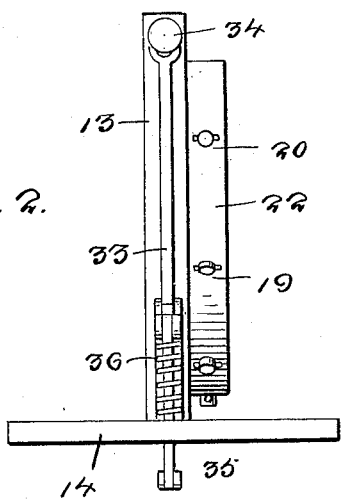
Fig. 2 is an end view.

The apparatus consists essentially of oppositely disposed operating and holding chucks 10 and 11 mounted in suitable uprights 12 and 13, or the equivalent thereof rising for example from a base 14, and a flexible knife 15 of arcuate or segmental form provided with a plurality of independently movable cutting elements or blades 16 having serrated or toothed edges 17 for scarifying or scarring the surface of the skin or rind of the fruit to open the vesicles or cells to liberate the essential oils which are adapted to be caught and retained by suitable receptacles such as sponges, (not shown) located conveniently to the plane of the knife. The blades are provided with stems 19 extending radially from the area prescribed by the operative edge of the knife and fitted in guide openings 20 and 21 in substantially parallel spaced segmental bands 22 and 23 which are terminally attached to the uprights 12 and 13. Also springs 24 are arranged upon the said stems, bearing at their outer ends against the bands or ring 22 and extending through the openings in the bands or ring 23 to bear against shoulders 25 on the blades, an additional or supplemental band or ring 26 preferably being disposed concentric with the bands 22 and 23 to serve as an additional or auxiliary support for the blades while being flexible to permit of the outward and inward movement of the latter, the outward movement obviously being in opposition to the tendency of the springs 24. The operative faces or edges of these blades are designed to follow the contour of the fruit which is being treated, so as to come into contact with all parts of the surface thereof as the said fruit is rotated upon the center defined by the chucks 10 and 11. The chuck 10 is carried by a revoluble shaft 27 to which is attached the pinion 28 in mesh with an intermediate gear 29 actuated by a driving gear 31 on the driving shaft 30 and the chuck 11 is carried by a stem 32 also adapted for rotary movement with the fruit interposed between the chucks and at the same time capable of longitudinal or axial movement, the same being held yieldingly in engagement with the fruit at one end of its axis by means of a bell crank lever 33 engaging at one end a grooved roller or spool 34 and provided at its other end with a rod 35 which is surrounded by a spring 36 tending to actuate the bell crank so as to move the stem 32 and hence the chuck 11 inwardly or toward the chuck 10.

After a definite, predetermined number of revolutions of the fruit, sufficient to remove substantially all of the essential oil, it is desirable to release the fruit and to this end any suitable mechanism may be employed, such for example as that indicated in a general way in Fig. 1 and embodying the bell crank levers 37 and 38 connected by the rod 39, the bell crank 37 being connected with the rod 39 and the bell crank 38 being arranged in the path of a plunger 40 actuable by a cam 41 carried by the driving shaft 31.

The mechanism described is adapted to remove the oil quickly and efficiently without otherwise injuring the fruit and without causing an admixture of foreign matter with the oil and the only attention required by the operator is to replace fresh fruit as the same is released by the mechanism after a sufficient number of revolutions to accomplish the desired object, and which obviously may be regulated in any preferred manner.

What is claimed is:—

1. An apparatus of the class described having an arcuate flexible knife consisting of a plurality of independently movable yieldingly sustained blades provided with serrated faces, and means for revolubly supporting fruit in surface contact with the operative faces of said knife blades.

2. An apparatus for the purpose described having an arcuate flexible knife consisting of blades having serrated operative faces and stems extending from said blades, guiding bands for the stems, springs for yieldingly holding the blades in operative relation, and means for revolubly supporting fruit in surface contact with the faces of the knife blades.

3. An apparatus for the purpose described having an arcuate flexible knife provided with serrated blade members and means for yieldingly holding the same in operative relation, opposed chucks for engaging a fruit at opposite ends of an axis thereof, means for communicating rotary motion to one of said chucks, and yielding means for maintaining the other chuck in engagement with the fruit.

4. An apparatus for the purpose described having a flexible arcuate knife, revoluble and axially movable chucks, and means for communicating rotary motion to the first named chuck, means for yieldingly holding the second named chuck in fruit engaging position, and means actuable by the operating devices for withdrawing the second named chuck after a predetermined number of revolutions of the first named chuck.

In testimony whereof I affix my signature.

VINCENT GIAMPIETRO.